United States Patent
Laux et al.

(10) Patent No.: US 9,956,843 B2
(45) Date of Patent: May 1, 2018

(54) CLIMATE CONTROL SYSTEM

(71) Applicant: MAHLE International GmbH, Stuttgart (DE)

(72) Inventors: Holger Laux, Dietingen (DE); Alexander Hess, Dinkelscherben (DE); Ronny Schlieder, Fellbach (DE)

(73) Assignee: MAHLE International GmbH, Stuttgart (DE)

( * ) Notice: Subject to any disclaimer, the term of this patent is extended or adjusted under 35 U.S.C. 154(b) by 98 days.

(21) Appl. No.: 14/951,977

(22) Filed: Nov. 25, 2015

(65) Prior Publication Data

US 2016/0159193 A1    Jun. 9, 2016

(30) Foreign Application Priority Data

Dec. 3, 2014    (DE) .......................... 10 2014 224 817

(51) Int. Cl.
| | |
|---|---|
| *B60H 1/34* | (2006.01) |
| *B60H 1/00* | (2006.01) |
| *B60S 1/02* | (2006.01) |
| *B60S 1/54* | (2006.01) |

(52) U.S. Cl.
CPC ....... *B60H 1/00057* (2013.01); *B60H 1/0005* (2013.01); *B60H 1/00035* (2013.01); *B60H 1/00564* (2013.01); *B60S 1/023* (2013.01); *B60S 1/54* (2013.01); *B60H 2001/00164* (2013.01)

(58) Field of Classification Search
CPC ..................................... B60H 1/34; B60S 1/54
USPC .................................................. 454/126, 121
See application file for complete search history.

(56) References Cited

U.S. PATENT DOCUMENTS

| | | | | |
|---|---|---|---|---|
| 4,460,036 A | * | 7/1984 | Yoshimi ............. | B60H 1/00842 165/203 |
| 4,482,009 A | * | 11/1984 | Nishimura ......... | B60H 1/00842 165/100 |
| 4,586,652 A | * | 5/1986 | Sakurai ............... | B60H 1/00064 165/202 |

(Continued)

FOREIGN PATENT DOCUMENTS

| | | |
|---|---|---|
| DE | 101 47 113 A1 | 4/2003 |
| DE | 103 37 195 A1 | 3/2005 |

(Continued)

*Primary Examiner* — Steven B McAllister
*Assistant Examiner* — Samantha Miller
(74) *Attorney, Agent, or Firm* — Muncy, Geissler, Olds & Lowe, P.C.

(57) ABSTRACT

A climate control system having a housing with an air inlet, a cooling element for providing cooled air, a heating element located downstream of the cooling element, a cold air duct for directing cooled air located downstream, a bypass duct for directing cooled air located downstream of the cooling element, a hot air duct for directing heated air, a first mixing chamber for mixing cooled air from the cold air duct and heated air from the hot air duct into blended air, a second mixing chamber located downstream of the bypass duct and downstream of the first mixing chamber for mixing cooled air from the bypass duct and blended air from the first mixing chamber, an air outlet located downstream of the second mixing chamber for delivering air to a passenger compartment, and an air deflector device is located downstream of the bypass duct.

12 Claims, 3 Drawing Sheets

(56) References Cited

U.S. PATENT DOCUMENTS

| | | | |
|---|---|---|---|
| 4,898,325 A | 2/1990 | Sakurada | |
| 5,983,987 A * | 11/1999 | Weindorf | B60H 1/00671 165/103 |
| 6,311,763 B1 * | 11/2001 | Uemura | B60H 1/00664 165/43 |
| 6,475,077 B2 * | 11/2002 | Arold | B60H 1/00064 165/42 |
| 6,668,909 B2 * | 12/2003 | Vincent | B60H 1/0005 165/203 |
| 7,878,235 B2 * | 2/2011 | Park | B60H 1/00007 165/202 |
| 8,544,533 B2 * | 10/2013 | Lee | B60H 1/00064 165/202 |
| 8,721,408 B2 * | 5/2014 | Ikeda | B60H 1/00064 165/203 |
| 9,446,654 B2 * | 9/2016 | Yamamoto | B60H 1/00064 |
| 9,464,837 B2 * | 10/2016 | Wang | F25B 49/022 |
| 9,533,548 B2 * | 1/2017 | Heilemann | B60H 1/00028 |
| 9,581,343 B2 * | 2/2017 | Berger | |
| 2002/0157811 A1 * | 10/2002 | Vincent | B60H 1/0005 165/59 |
| 2003/0045224 A1 * | 3/2003 | Vincent | B60H 1/0005 454/156 |
| 2005/0202775 A1 * | 9/2005 | Han | B60H 1/00007 454/156 |
| 2006/0021424 A1 * | 2/2006 | Ishikawa | B60H 1/00064 73/114.01 |
| 2006/0118291 A1 | 6/2006 | Muraki | |
| 2006/0223431 A1 * | 10/2006 | Park | B60H 1/00007 454/156 |
| 2009/0117841 A1 * | 5/2009 | Goto | B60H 1/00064 454/127 |
| 2009/0215379 A1 * | 8/2009 | Matsunoo | B60H 1/0005 454/160 |
| 2015/0343879 A1 * | 12/2015 | Herrmann | B60H 1/00064 165/203 |

FOREIGN PATENT DOCUMENTS

| | | |
|---|---|---|
| DE | 10 2005 057 452 A1 | 7/2006 |
| DE | 10 2012 022 214 A1 | 5/2014 |
| EP | 0 288 743 A1 | 11/1988 |

* cited by examiner

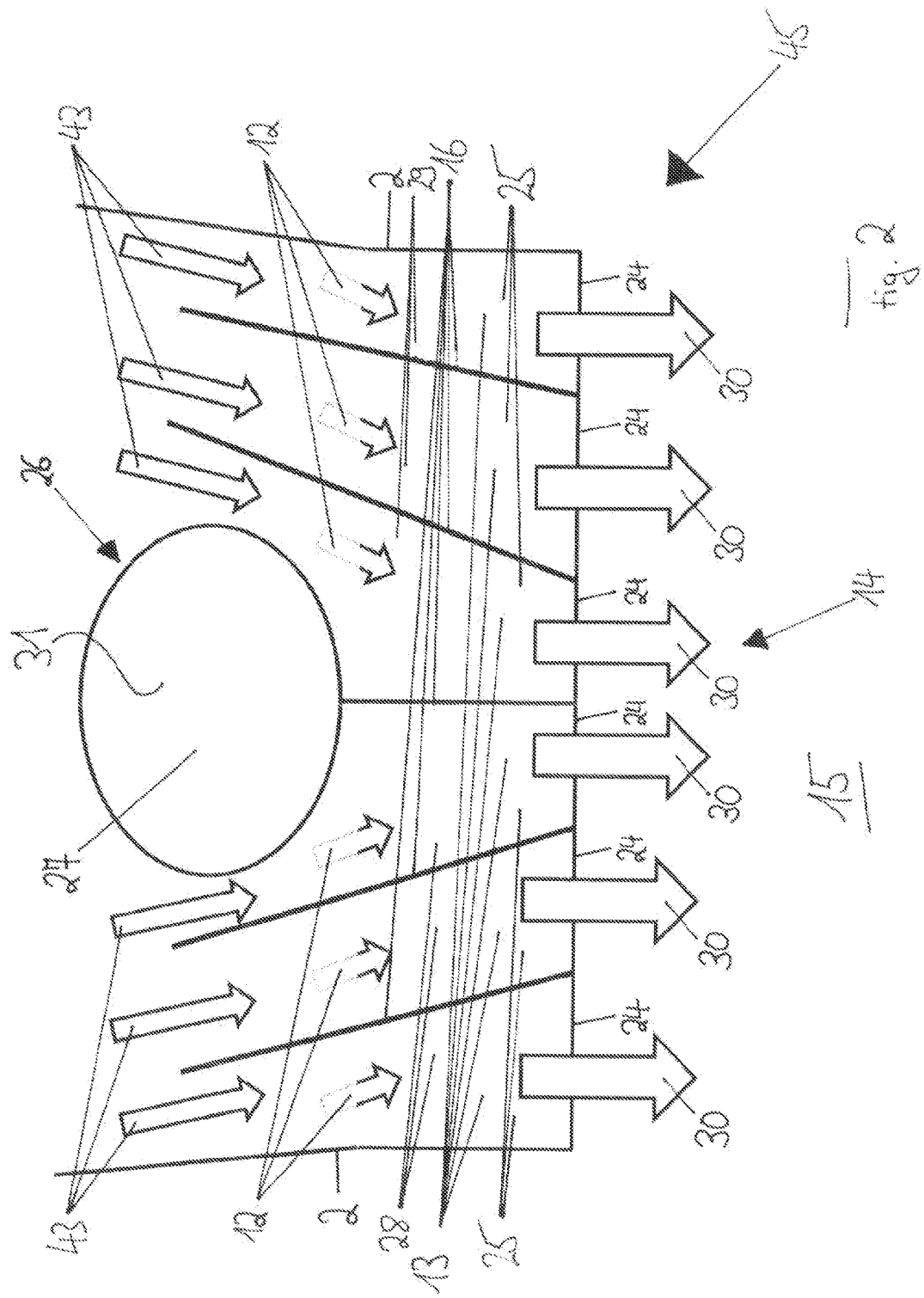

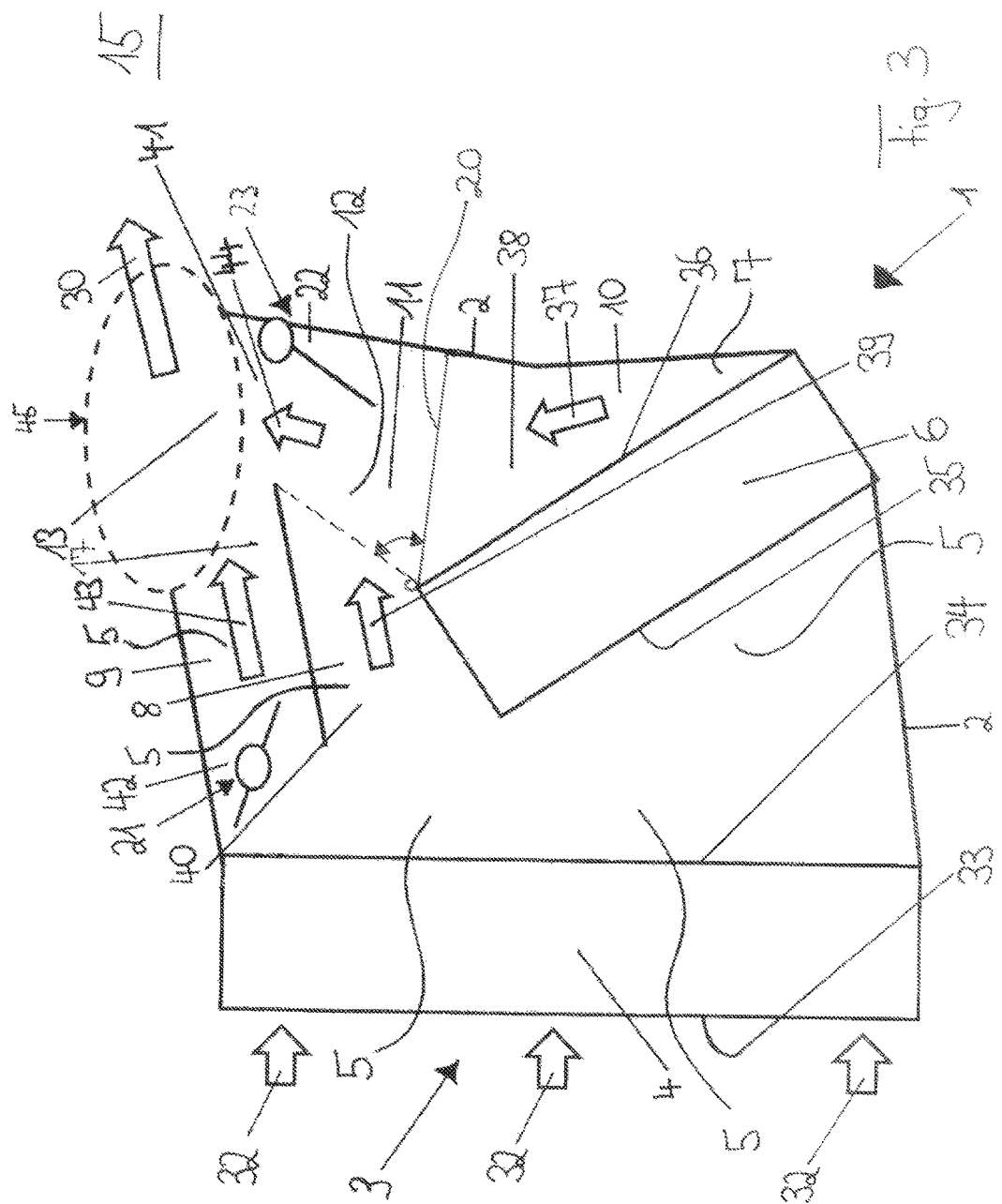

CLIMATE CONTROL SYSTEM

This nonprovisional application claims priority under 35 U.S.C. § 119(a) to German Patent Application No. 10 2014 224 817.5, which was filed in Germany on Dec. 3, 2014, and which is herein incorporated by reference.

BACKGROUND OF THE INVENTION

Field of the Invention

The invention concerns a climate control system, in particular a climate control system for a motor vehicle.

Description of the Background Art

Climate control systems are provided in motor vehicles, in particular, for temperature control of the passenger compartment. It is known from the prior art for climate control systems to have a heating element and a cooling element, such as, e.g., an evaporator, in order to be able to heat or cool the air that can be delivered to the passenger compartment. It is additionally known for climate control systems to have a plurality of air outlet regions to permit a temperature distribution in the passenger compartment that is comfortable for a passenger.

The document DE 10 2012 022 214 A1 discloses a mixing chamber that serves to mix cooled air that is cooled by an evaporator and heated air that is heated by a heating element. Blended air produced in this manner can be delivered to the passenger compartment through a plurality of air outlet regions. Moreover, this document discloses a bypass duct that can direct cooled air produced by the evaporator past the heating element and the mixing chamber, so that the cooled air can also be delivered to the passenger compartment without mixing with heated air.

Known from the document DE 10 2005 057 452 A1, which corresponds to US 2006/0118291, is a short circuit duct that diverts a portion of the cooled air from a bypass duct located downstream of an evaporator and above a heating element. The short circuit duct conducts the diverted cooled air above and past the evaporator, and conducts the diverted cooled air to the inlet of the evaporator, in order to be able to reduce the temperature of the air via recirculation of the air before it is delivered to the passenger compartment, in particular immediately after an engine startup on hot days.

Known from the document EP 0 288 743 A1, which corresponds to U.S. Pat. No. 4,898,325, is a climate control system that has a bypass duct that directs air cooled by an evaporator above and past a heating element and a mixing chamber. Moreover, a bypass flap is arranged downstream of the bypass duct to adjust the volume of cooled air flowing through the bypass duct. The cooled air flowing through the bypass duct is distributed among air ducts that lead to ventilation outlets.

Bypass ducts are thus known from the prior art that guide cooled air past a heating element. However, the temperature control of the passenger compartment depends on the air ducts downstream of the bypass duct, which guide cooled air and/or blended air to the ventilation outlets.

SUMMARY OF THE INVENTION

It is therefore an object of the invention to provide a climate control system in which the temperature control of the air flowing out through the ventilation outlets into the passenger compartment is more independent of the air ducts downstream of the bypass duct, and that can better fulfill a passenger desire for comfortable temperature control of the passenger compartment.

An exemplary embodiment of the invention provides a climate control system having a housing with an air inlet, having a cooling element for providing cooled air, and having a heating element for providing heated air, wherein the heating element is located downstream of the cooling element in the housing, having a cold air duct for directing cooled air located downstream of the cooling element, having a bypass duct for directing cooled air located downstream of the cooling element, having a hot air duct for directing heated air located downstream of the heating element, having a first mixing chamber located downstream of the cold air duct and downstream of the hot air duct for mixing cooled air from the cold air duct and heated air from the hot air duct into blended air, having a second mixing chamber located downstream of the bypass duct and downstream of the first mixing chamber for mixing cooled air from the bypass duct and blended air from the first mixing chamber, having an air outlet located downstream of the second mixing chamber for delivering air to a passenger compartment, wherein an air deflector device is located downstream of the bypass duct. This has the advantage that the cooled air flowing through the bypass duct, which is cooled upstream of the bypass duct by the cooling element, in particular by an evaporator, can be distributed downstream of the bypass duct. Temperature control of the air delivered to the passenger compartment through the air outlet thus becomes more independent of the design of the climate control system downstream of the bypass duct. Moreover, with the air deflector device according to the invention it is possible to adjust the temperature control in the passenger compartment to customer-specific desires.

The bypass duct can have a downstream section and for the air deflector device to extend into the downstream section of the bypass duct. In this way, distribution of the cooled air flowing through the bypass duct is possible as far back as the downstream section of the bypass duct, thereby improving the distribution of the air among the air outlets.

The cold air duct can have a cold air regulating element and/or the hot air duct can have a hot air regulating element and/or for a blended air regulating element to be located in the first mixing chamber. It is thus possible to adjust the volume of cooled air flowing through the cold air duct into the first mixing chamber and/or to adjust the volume of heated air flowing through the hot air duct into the first mixing chamber. In this way, it is possible to determine the temperature of the blended air that is mixed in the first mixing chamber from the cooled air from the cold air duct and the heated air from the hot air duct.

The bypass duct can have a bypass regulating element. In this way it is possible to adjust the volume flow rate of cooled air that passes through the bypass duct.

In an embodiment, a blended air outlet control element can be located at a downstream position of the first mixing chamber. In this way, the volume of blended air flowing out of the first mixing chamber can be determined.

The air outlet can have a plurality of air outlet regions. Consequently, air can flow out into a plurality of regions in the passenger compartment, and in this way produce a comfortable temperature sensation for the vehicle's occupants.

The air deflector device can form a duct or a plurality of ducts. In this way, air can be guided to the air outlet in one duct or in a plurality of ducts. It is thus additionally possible, when there are a plurality of ducts, for the individual ducts to have different volume flow rates of cooled air flowing through them, and thus to have different temperatures after mixing in the second mixing chamber with the blended air from the first mixing chamber.

At least one duct of the air deflector device can be allocated to at least one air outlet region. Consequently, an air outlet region can be temperature-controlled independently of the other air outlet regions, since the volume flow rate in the duct that flows to one air outlet region is independent of the volume flow rates in the other ducts due to the division by the air deflector device. As a result, it is possible for the air outlet regions to be temperature-controllable independently of one another, thus making it possible to improve the comfort of a vehicle occupant.

A plurality of ducts of the air deflector device can be arranged next to one another, such as, in particular, to be arranged horizontally or vertically adjacent to one another. This makes it possible for the cooled air to be divided among a plurality of the ducts, especially in the upstream section of the air deflector device.

The housing of the climate control system can have a defrost duct that delivers defrost air to a defrost outlet that is located in an upper position of the housing. Consequently, the defrost air flowing through the defrost duct can flow out of the defrost outlet toward a windshield, and thus reduce or prevent fogging of a windshield.

The majority of ducts can have first ducts and second ducts, and the first ducts and the second ducts can be arranged to run past the defrost duct on different sides. As a result, it is possible to advantageously direct cooled air past the defrost duct in a plurality of ducts.

It is also advantageous for the ducts to be routed in a curve around the defrost duct. As a result, it is possible to take full advantage of the available installation space in a beneficial way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a top view of a section, shown in dashed lines in FIG. 1, of an exemplary embodiment of a climate control system from FIG. 1 having an air deflector device according to the invention.

FIG. 3 is a longitudinal section through an exemplary embodiment of a climate control system according to the invention.

DETAILED DESCRIPTION

Figure 1:
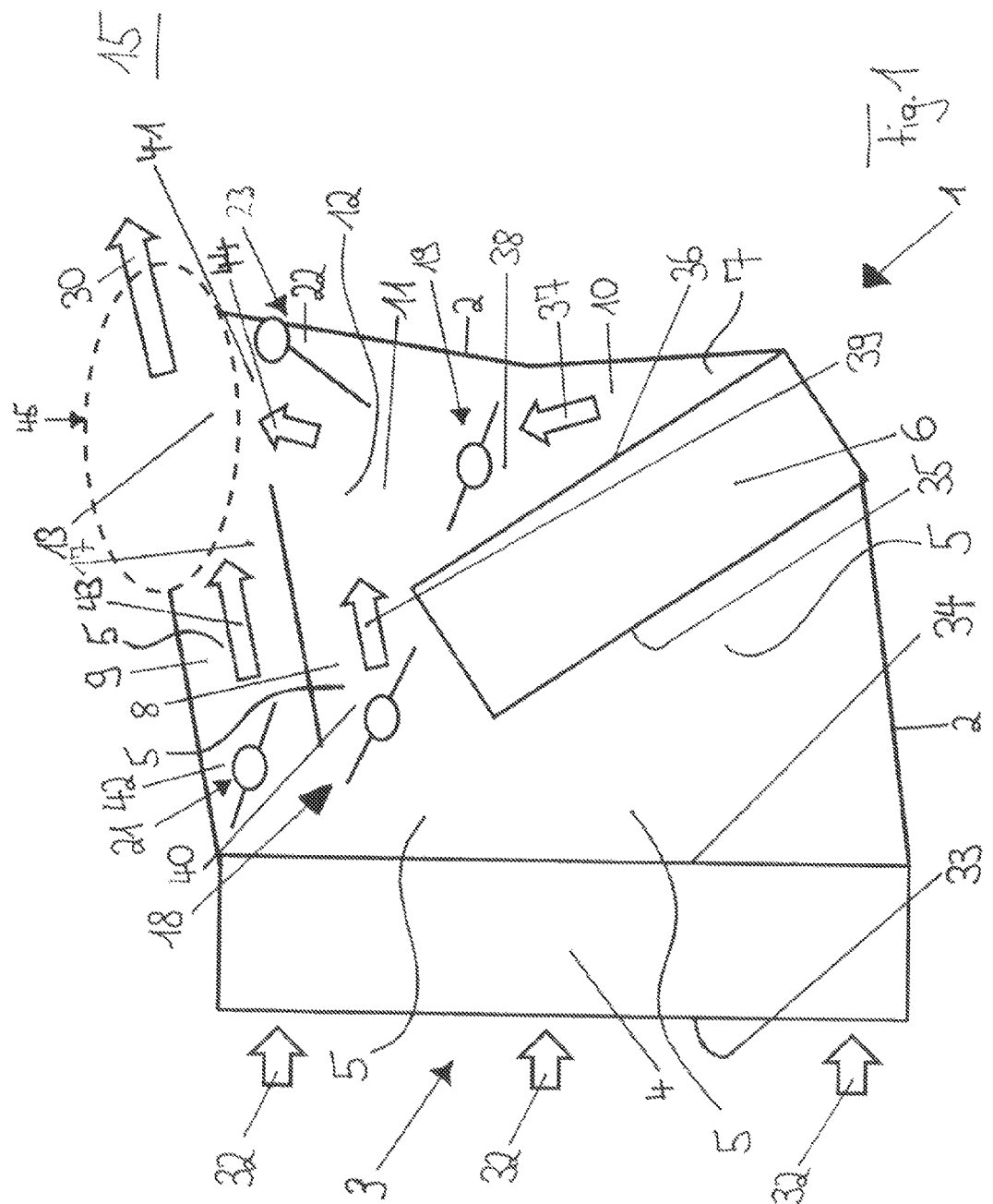
FIG. 1 is a longitudinal section through an exemplary embodiment of a climate control system according to the invention.

FIG. 1 shows a longitudinal section through an exemplary embodiment of a climate control system 1 according to an embodiment of the invention.

The climate control system 1 has a housing 2 and a cooling element 4, which is arranged in the housing 2 of the climate control system 1 as shown in FIG. 1, or alternatively can also be arranged such that it connects with the housing 2. In particular, the cooling element 4 is implemented as an evaporator.

The housing 2 has an air inlet 3, which is located downstream of the cooling element 4. The air inlet 3 is arranged such that air 32, in particular outside air as fresh air and/or interior air as recirculated air from a passenger compartment 15, can flow through the air inlet 3 of the housing 2 toward the cooling element 4 in the climate control system 1.

On two opposing sides, the cooling element 4 has an air inlet 33 and an air outlet 34, with the air inlet 33 of the cooling element 4 being located upstream of the air outlet 34 of the cooling element 4 and downstream of the air inlet 3 of the housing 2.

The air 32 flowing through the air inlet 3 to the cooling element 4 flows through the air inlet 3 into the interior of the cooling element 4. The air 32 in the interior of the cooling element 4 is cooled by a release of energy that is supported by a phase transition from liquid to gaseous of a refrigerant that is used in an evaporator. Cooled air 5 flows through the air outlet 34 out of the cooling element 4, as shown in FIG. 1.

Downstream of the cooling element 4, the climate control system 1 has a heating element 6, wherein the heating element 6 has an air inlet 35 and an air outlet 36. In particular, it is advantageous for the air inlet 35 and the air outlet 36 to be located on two opposing sides of the heating element, as shown in FIG. 1. The heating element 6 is arranged such that the cooled air 5 that flows out of the air outlet 34 of the cooling element 4 can flow through the air inlet 35 of the heating element 6 into the interior of the heating element 6. The cooled air 5 is heated in the interior of the heating element 6 by supplying energy, and the air 7 thus heated flows out of the heating element 6 through the air outlet 36. It is advantageous for the heating element 6 to be arranged at a lower position in the housing 2, as can be seen in FIG. 1. In addition, it is possible to arrange the heating element 6 at another advantageous position in the housing 2, or such that it is connected to the housing 2.

Formed downstream of the heating element 6 is a hot air duct 10, through which the air 7 can flow that has been heated by the heating element 6. It is particularly advantageous for the hot air duct 10 to be bordered by at least one wall of the housing 2 and the air outlet 36 of the cooling element 4, as shown in FIG. 1.

The heated air 7 has a flow direction 37 in the hot air duct 10. In especially advantageous fashion, as shown in FIG. 1, the flow direction 37 points upward at a distance from the heating element 6, or is inclined upward.

The hot air duct 10, as can be seen in FIG. 1, can have a hot air regulating element 19, which controls the volume of heated air 7 flowing through the hot air duct 10. In particular, it is useful to arrange the hot air regulating element 19 at a downstream position 38 of the hot air duct 10 as in FIG. 1. In particular, implementation of the hot air regulating element 19 as a rotatable flap or an extensible sliding element is advantageous.

Downstream of the cooling element 4, a cold air duct 8 is formed in the housing 2 of the climate control system 1, wherein, as shown in FIG. 1, the cooled air 5 can flow through the cold air duct 8. The cold air duct 8 is arranged such that the cooled air 5 flowing through the cold air duct 8 is conducted past the heating element 6. It is advantageous that the cold air duct 8 is arranged above the heating element 6, as is shown in FIG. 1. In addition, it is possible for the cold air duct 8 to be arranged below the heating element 6. In particular, the cold air duct 8 is arranged such that the cooled air 5 is usefully conducted past the heating element 6. The cooled air 5 has a flow direction 39 in the cold air duct 8.

As shown in FIG. 1, the cold air duct 8 can have a cold air regulating element 18, with the cold air regulating element 18 serving to adjust the volume of cooled air 5 flowing through the cold air duct 8. In particular, it is advantageous for the cold air regulating element 18 to be arranged at an upstream position 40 of the cold air duct 8, as can be seen in FIG. 1. In addition, it is possible to arrange the cold air regulating element 18 at a different useful position. In particular, the cold air regulating element 18 can be implemented as a rotatable flap or as an extensible sliding element.

Located downstream of the hot air duct 10, in which the air 7 heated by the heating element 6 can flow, and downstream of the cold air duct 8, in which the air 5 cooled by the cooling element 4 can flow, is a first mixing chamber 11. In the first mixing chamber 11, the cooled air 5 from the cold air duct 8 and the heated air 7 from the hot air duct 10 are mixed to form a blended air 12, as in FIG. 1.

It is possible for there to be located in the first mixing chamber 11 a blended air regulating element 20 as shown in FIG. 3, which can control the volume flow rate of the heated air 7 flowing through the hot air duct 10 and/or the volume flow rate of the cooled air 5 flowing through the cold air duct 8, wherein the blended air regulating element 20, in particular, a rotatable flap element.

In particular with the cold air regulating element 18 and/or the hot air regulating element 19 or with the above-described blended air regulating element 20, it is possible to control the temperature of the blended air 12 in the first mixing chamber 11.

The first mixing chamber 11 has at least one opening 41 at the downstream side, and a blended air outlet control element 23 is usefully arranged at a downstream position 22 of the first mixing chamber 11. The blended air 12 can flow out of the first mixing chamber 11 through the at least one opening 41. The blended air outlet control element 23 can close the at least one opening 41 fully or partially in such a manner that the volume of blended air 12 flowing out of the first mixing chamber 11 can be controlled by the blended air outlet control element 23. In particular, implementation of the blended air outlet control element 23 as a flap is advantageous.

The blended air 12 flowing out of the first mixing chamber 11 has a flow direction 44 at the location of the opening 41.

The climate control system 1 has a bypass duct 9, which is located downstream of the cooling element 4 in the housing 2, or can also advantageously be arranged to connect with the housing 2, wherein the cooled air 5 can flow through the bypass duct 9. The bypass duct 9 serves to direct a portion of the cooled air 5, which does not flow into the air inlet 35 of the heating element 6 or into the cold air duct 8, past the heating element 6 and past the cold air duct 8 and the first mixing chamber 11. FIG. 1 shows an advantageous embodiment in which the bypass duct 9 is located above the cold air duct 8 and above the heating element 6. It is additionally possible for the bypass duct 9 to be located below the cold air duct 8 and/or below the heating element 6. In addition, the bypass duct 9 can be arranged at a different advantageous position.

It is possible for a bypass regulating element 21 to be arranged in the bypass duct 9 in order to adjust the volume of cooled air 5 that flows through the bypass duct 9. As shown in FIG. 1, it is advantageous for the bypass regulating element 21 to be arranged at an upstream position 42 of the bypass duct 9. In addition, it is useful to arrange the bypass regulating element 21 at a different advantageous position of the bypass duct 9. In particular, the bypass regulating element 21 can be implemented as a rotatable flap or as an extensible sliding element.

The cooled air 5 flowing in the bypass duct 9 has a flow direction 43.

The climate control system 1 has a second mixing chamber 13, which is arranged downstream of the bypass duct 9 and downstream of the first mixing chamber 11. In the second mixing chamber 13, the cooled air 5 flowing out of the bypass duct 9 with the flow direction 43 can be mixed with the blended air 12 flowing out of the first mixing chamber 11 with the flow direction 44 to create an air 30, which can be delivered to the passenger compartment 15.

The bypass regulating element 21 and the blended air outlet control element 23 control the volume of the cooled air 5 flowing into the second mixing chamber 13 or the volume of the blended air 12, and thus the temperature of the air 30 that can be delivered to the passenger compartment 15.

In FIG. 1, a section 45 is shown in dashed lines, and FIG. 2 shows a top view of the section 45 from FIG. 1, of an exemplary embodiment of a climate control system 1 from FIG. 1 having an air deflector device 16 according to the invention.

As shown in FIG. 2, the climate control system 1 has an air outlet 14, which has a plurality of air outlet regions 24. The air outlet 14 with a plurality of air outlet regions 24 serves to deliver air 30, which is mixed in the second mixing chamber 13, to the passenger compartment 15, wherein the air 30 can flow into the passenger compartment 15 through the plurality of air outlet regions 24 at different positions.

The air outlet 14 with a plurality of air outlet regions 24 is located downstream of the second mixing chamber 13.

The climate control system 1 has, as is evident in FIG. 2, a defrost duct 26, and the defrost duct 26 forms a defrost outlet 27 as an open end downstream, wherein defrost air 31 can flow through the defrost duct 26, and the defrost air 31 can flow out of the defrost duct 26 through the defrost outlet 27 into the passenger compartment 15, in particular into a region where a windshield is located.

It is evident from FIG. 2 that the defrost outlet 27 is located at a top and, in particular, center position of the housing 2.

Downstream of the bypass duct 9, the climate control system 1 has an air deflector device 16 according to the invention, which is located in the second mixing chamber 13. In addition, it is possible for the bypass duct to have a downstream section 17 as in FIG. 1 and for the air deflector device 16 according to the invention to extend into the downstream section 17.

The air deflector device 16 forms a duct 25 or a plurality of ducts 25. At least one duct 25 is allocated to at least one air outlet region 24, wherein it is useful for each duct 25 to be allocated to exactly one air outlet region 24.

The air deflector device 16 is designed such that the cooled air 5 that flows out of the bypass duct 9 is conducted past the defrost duct 26 in the ducts 25 of the air deflector device 16.

The air deflector device 16 has at least one first duct 28 and at least one second duct 29, wherein the at least one first duct 28 and the second duct 29 are arranged to run past the defrost duct 26 on different sides. As shown in FIG. 1, in a top view the at least one first duct 28 is arranged to pass to the left of the defrost duct 26, and the at least one second duct 29 is arranged to pass to the right of the defrost duct 26.

In particular, is useful for the ducts 25 of the air deflector device 16 to be arranged to run in a curve around the defrost duct 26.

The air deflector device 16 serves to divide the cooled air 5 from the bypass duct 9 into a plurality of ducts 25, wherein the air deflector device 16 can, in particular, also extend downstream of the second mixing chamber 13. The air deflector device 16 has the purpose of allowing temperature control of the temperature of the air 30 that can be delivered to the passenger compartment 15 in each individual duct 25, independently of the rest of the ducts.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A climate control system comprising:
    a housing with an air inlet;
    a cooling element providing cooled air;
    a heating element providing heated air, the heating element being located downstream of the cooling element in the housing;
    a cold air duct directing cooled air located downstream of the cooling element;
    a bypass duct directing cooled air located downstream of the cooling element;
    a hot air duct directing heated air located downstream of the heating element;
    a first mixing chamber located downstream of the cold air duct and downstream of the hot air duct for mixing cooled air from the cold air duct and heated air from the hot air duct into blended air;
    a second mixing chamber located downstream of the bypass duct and downstream of the first mixing chamber for mixing cooled air from the bypass duct and blended air from the first mixing chamber;
    at least two air outlet regions located downstream of the second mixing chamber for delivering air to a passenger compartment; and
    an air deflector device arranged downstream of the bypass duct,
    wherein the housing of the climate control system has a defrost duct that delivers defrost air to a defrost outlet that is located in an upper position of the housing, and
    wherein the air deflector device is provided inside of the second mixing chamber and is formed of at least two air deflector ducts partitioned from each other to divide the cooled air exiting from the bypass duct and guide the cooled air to the at least two air outlet regions, the at least two air deflector ducts of the air deflector device being discrete from and extending around at least one side of the defrost duct.

2. The climate control system according to claim 1, wherein the bypass duct has a downstream section, and wherein the air deflector device extends into the downstream section of the bypass duct.

3. The climate control system according to claim 1, wherein the cold air duct has a cold air regulating element and the hot air duct has a hot air regulating element or wherein a blended air regulating element is located in the first mixing chamber.

4. The climate control system according to claim 1, wherein the bypass duct has a bypass regulating element.

5. The climate control system according to claim 1, wherein a blended air outlet control element is located at a downstream position of the first mixing chamber.

6. The climate control system according to claim 1, wherein the at least two air deflector ducts are allocated to the at least two air outlet regions, respectively.

7. The climate control system according to claim 1, wherein the at least two air deflector ducts are arranged next to one another or are arranged horizontally or vertically adjacent to one another.

8. The climate control system according to claim 1, wherein the at least two air deflector ducts include first ducts and second ducts, and the first ducts and the second ducts are arranged to run past the defrost duct on different sides.

9. The climate control system according to claim 8, wherein the first ducts and the second ducts are routed in a curve around the defrost duct.

10. The climate control system according to claim 1, wherein the air deflective device is stationary and unmovable.

11. The climate control system according to claim 1, wherein an opening is provided between the first mixing chamber and the second mixing chamber and a blended air outlet control element is provided to open and close the opening.

12. The climate control system according to claim 11, wherein the blended air outlet control element is a regulating flap.

* * * * *